(No Model.) 2 Sheets—Sheet 1.
R. H. KERSEY.
BOILER FEEDER AND REGULATOR.
No. 439,749. Patented Nov. 4, 1890.
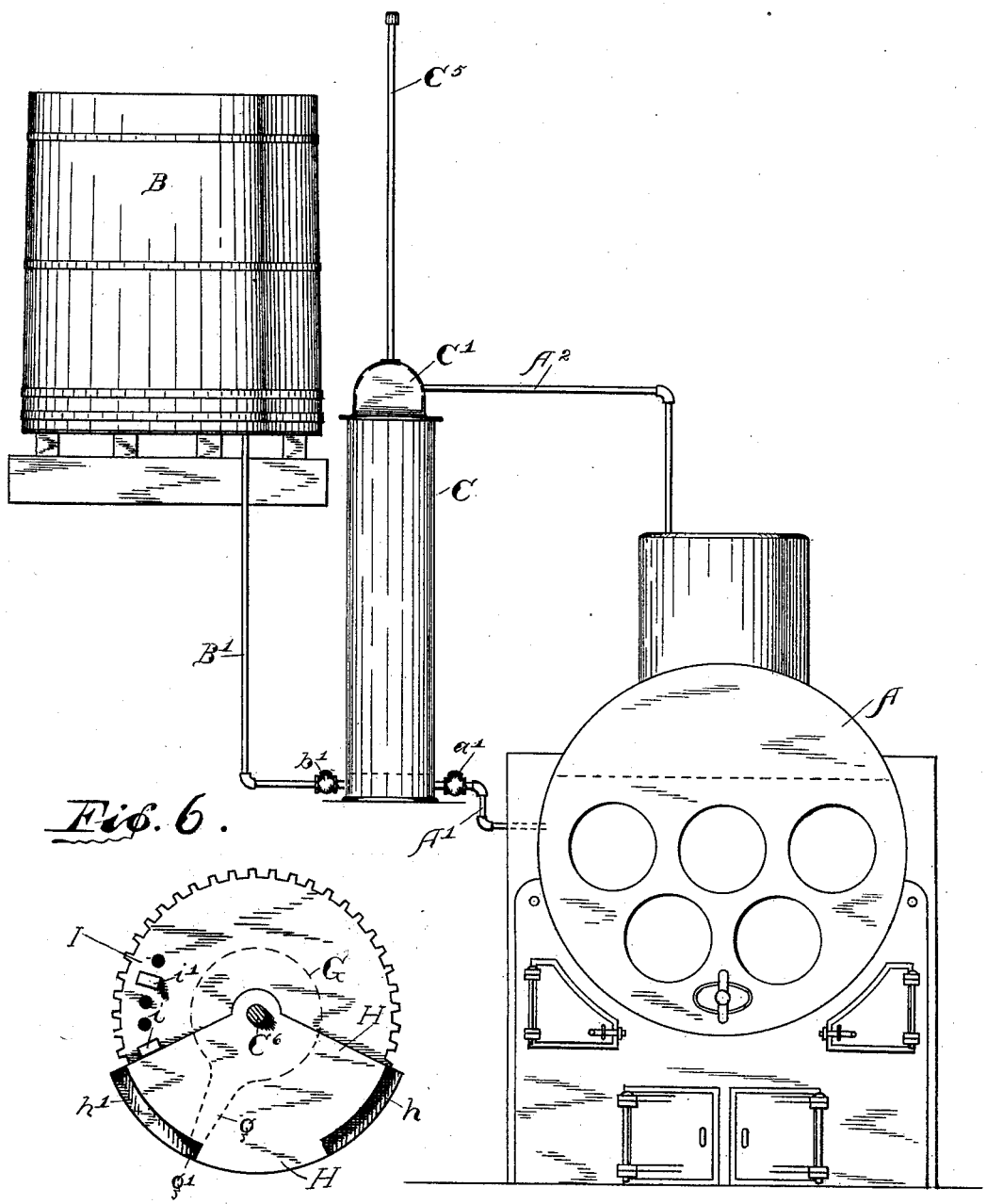

(No Model.) 2 Sheets—Sheet 2.
R. H. KERSEY.
BOILER FEEDER AND REGULATOR.
No. 439,749. Patented Nov. 4, 1890.
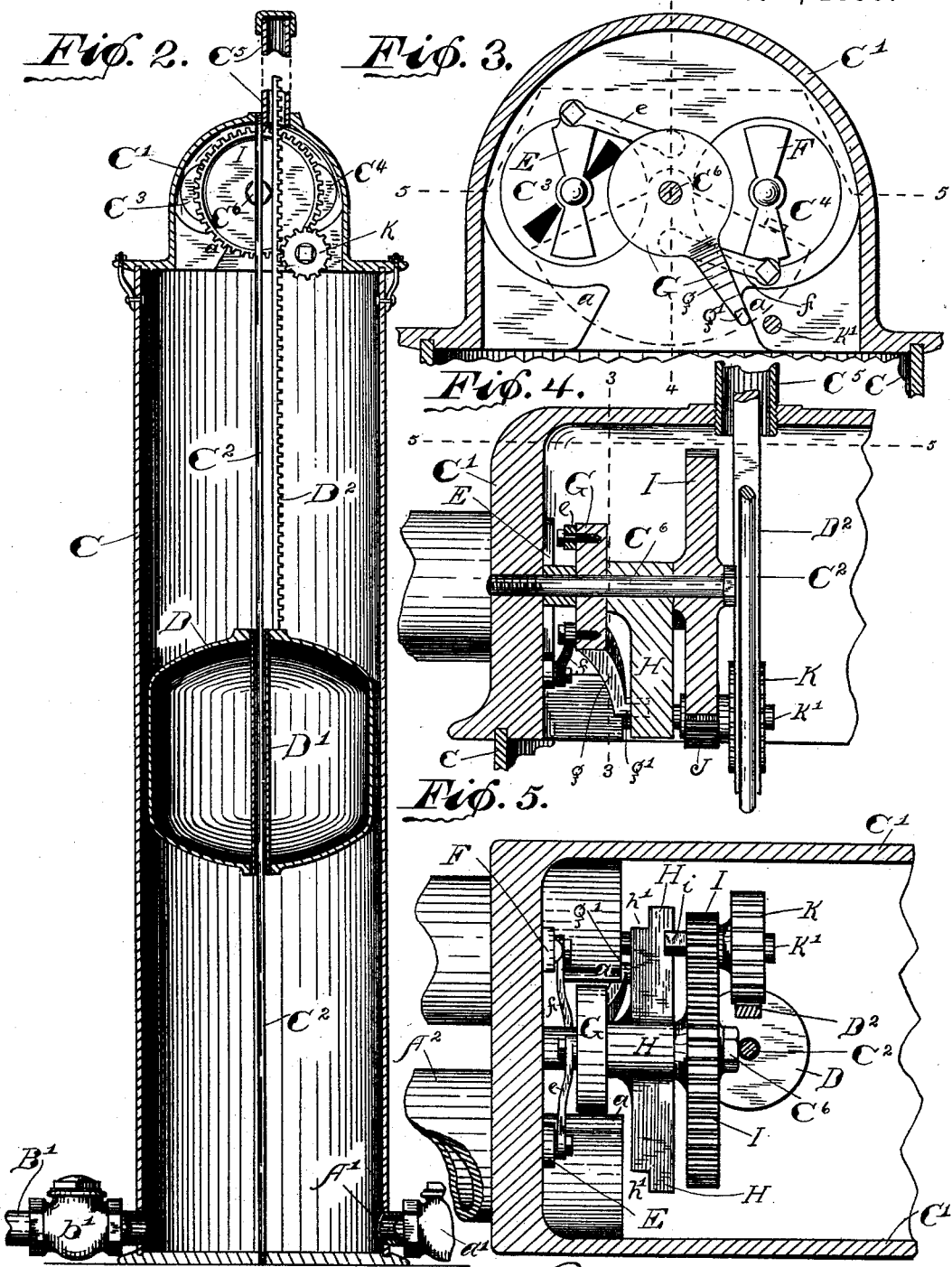
WITNESSES.
F. Dean Rhodes
James Walsh
INVENTOR.
Robert H. Kersey,
per C. & E. W. Bradford,
ATTORNEYS.

UNITED STATES PATENT OFFICE.

ROBERT H. KERSEY, OF LEBANON, INDIANA.

BOILER FEEDER AND REGULATOR.

SPECIFICATION forming part of Letters Patent No. 439,749, dated November 4, 1890.

Application filed January 16, 1890. Serial No. 337,085. (No model.)

*To all whom it may concern:*

Be it known that I, ROBERT H. KERSEY, a citizen of the United States, residing at Lebanon, in the county of Boone and State of Indiana, have invented certain new and useful Improvements in Boiler Feeders and Regulators, of which the following is a specification.

The object of my said invention is to produce a device whereby water can be automatically fed to steam-boilers and the quantity of water therein automatically regulated. Said invention will first be fully described, and then pointed out in the claims.

Referring to the accompanying drawings, which are made a part hereof, and on which similar letters of reference indicate similar parts, Figure 1 is an elevation, including a steam-boiler, a water-tank, and my improved feeding and regulating device; Fig. 2, a central sectional view of said feeder and regulator separately; Fig. 3, a vertical sectional view of the upper half of the same, as seen when looking toward the left from the dotted line 3 3 in Fig. 4; Fig. 4, a vertical sectional view looking toward the right from the dotted lines 4 4 in Figs. 2 and 3; Fig. 5, a horizontal sectional view looking downwardly from the dotted line 4 4, and Fig. 6 a view looking toward the right from the dotted line 3 3.

In said drawings, the portions marked A represent the steam-boiler; B, the water-tank; C, the shell of my improved feeder; D, a float therein; E F, valves; G, a lever by which said valves are operated; H, a weight by which said lever is operated; and I J K, a train of gear-wheels operated by a rack on the float, and through which said float is enabled to operate said weight.

The boiler A is an ordinary steam-boiler, and is connected to my improved feeder by a pipe A', in which is an ordinary check-valve $a'$. The low-water line therein is indicated by a dotted line across its end, and a similar dotted line in the same horizontal plane across the lower end of the feeder indicates the low-water line in said feeder.

The tank B is a water-tank, and may be of any desired construction. It is located, in operation, somewhat above the level of the boiler and the feeder and regulator. It is connected to the feeder and regulator by a pipe B', in which is an ordinary check-valve $b'$.

The casing C of my improved feeder and regulator may be and preferably is a section of large pipe. I have used such a section of pipe eight inches in diameter and thirty-three inches in length to good advantage. It is closed tightly at the top and bottom, and is adapted to hold the water, and inside of it is located the float, and also in its upper portion, or in a cap-like top C' secured thereto, is located the valves and the mechanism for operating them. Extending up through its center is a small rod $C^2$, which serves as a guide or way for the float.

The float D is or may be an ordinary hollow float, preferably cylindrical in general outline, with its ends arched to resist pressure. Its diameter is somewhat less than the diameter of the pipe or casing C, in which it is located, so that in operation it does not come in contact with the sides of said pipe or casing. Through its center is a small pipe D', through which the rod C' passes, whereby said float is guided as it moves up and down and held accurately to a central position. Extending up from the upper end of this float is a rack-bar $D^2$, which engages with and operates the train of gearing, as will be presently explained. The upper end of this rack-bar is guided and held to proper position by the tube or hollow way $C^3$, into which the upper end of the rack-bar on the float enters, and whereby said rack-bar is guided and held in position, as will be readily understood.

Entering the upper end of the casing C, or the cap-like top C' thereon, (which top is preferably a casting,) are two openings, which terminate in valve-seats $C^3$ $C^4$. One of these openings is connected to a pipe $A^2$, which leads to the dome or steam-space in the boiler A. The other leads to an exhaust pipe or opening.

The valves E and F are centrally mounted upon the valve-seats $C^3$ $C^4$, and are provided with extended arms or portions connected by links $e f$ with the lever G, by which they are operated. These connections are so adjusted that when one valve is turned so that the opening in the valve-seat is uncovered, and consequently opened for the passage of the steam, the other will be closed and the passage shut. The operation is, as will be presently described, that the live steam is admitted at one period in the operation of the device until that operation is completed, when the mechanism is reversed and the live steam shut off, while at the same time the other valve is thrown open and the steam permitted to exhaust or escape.

The lever G may be in the form of a disk with an extended arm $g$, said disk being centrally loosely mounted upon a shaft or bearing $C^5$, as shown, and the arm extending out to one side, where it can be operated by the weight falling against it. The links $e\ f$ are pivoted to opposite sides of the disk portion of this lever, and their other ends are pivoted to the valves, as shown and as will be readily understood.

The weight H is also loosely mounted on the shaft $C^5$, and is adapted to be thrown over said shaft by the operation of the train of gearing. In form it is preferably a segment of a circle with two notches $h'$ therein at opposite corners. When this weight is thrown over the shaft $C^6$ in one direction, one of these notches comes in contact with the projection $g'$ on the arm of the lever G and throws said lever to one side, opening one of the valves and closing the other. When it is thrown over said shaft in the other direction, the other notch comes in contact with said projection on said lever and closes the valve before opened, while opening the one which had been closed. The nearest sides of the notches in said weight are just far enough apart so that when the weight falls to the position its momentum would naturally carry it the valves have been operated just the desired distance. The lever G is kept from being accidentally thrown or forced too far by this weight by being confined in a recess or between projections, as $a$, in the casing or frame-work which surrounds the mechanism.

The train of gearing I J K consists of ordinary gear-wheels mounted loosely upon shafts and adapted to be operated by the movement of the rack-bar carried by the float. As will be noticed, they are so geared that the float gains largely in leverage in the movement, and thus is enabled to operate a much greater weight than it would be if it operated directly thereon. Upon the gear-wheel I is a projection $i$, which engages with the weight H and gives it its movement. There may be a second projection $i'$, as shown in Fig. 6, and this, if used, is preferably adjustable, for reasons which will presently be given.

The operation of my said invention is as follows: The feeder being empty and the tank being filled with water, the water will run from the tank into the feeder through the pipe B', the check-valve therein being so arranged as to not retard the flow of water under these circumstances. While this is going on, the valve which is the escape or exhaust valve is open, and the valve through which the steam enters the feeder and regulator is closed. As the water flows into the feeder and regulator, it raises the float D, which, through its rack-bar and the train of gearing, gradually moves the weight H until, when said feeder and regulator is nearly filled, it has raised said weight up far enough over its shaft $C^4$ so that it will fall upon the other side, which it does, striking the lever G and reversing the valves. The steam in the boiler then rushes into said feeder and regulator, causing an equal pressure therein to that in the boiler, which causes the water to flow out through the pipe A' into the boiler A. The check-valve in said pipe is so set as not to interfere with this operation until the level of the water therein is equal to the level of the water in said feeder and regulator. The pressure being greater in the feeder and regulator than from the tank, the check-valve B' in the pipe is closed by the back-pressure, so that no further water enters from the tank until the operation is again reversed. As the water flows out of the feeder and regulator toward the boiler, the float descends, reversing the movement of the gearing, until finally, when the water has been consumed to the predetermined level by being converted into steam, the weight H is thrown over into its former position, which shuts off the live steam and opens the exhaust-port, when of course immediately the pressure in the boiler becomes greater than that in the tank, shutting the check-valve $a'$ and permitting the operation just described to be repeated, and so on, as often as it is necessary to replenish the water in the boiler, and so on from time to time, as will be readily understood.

As before stated, there are preferably two projections $i$ and $i'$ on the wheel I. One of these is essential to the operation of the device. The other, while not essential, effects a valuable result. It is sometimes desirable to vary the low-water level somewhat in the boiler, and by the use of this variable projection or pin $i'$ this can be effected. In the revolution of the wheel I, as will be readily understood, the weight H is turned whenever the projection $i$ or $i'$ carries its center of gravity beyond a vertical line running upwardly from the center of the shaft $C^6$. By having one of these projections ($i'$) variable the weight may be thrown over at a time when the float has more or less nearly approached the bottom of the feeder. When it is desired that the low-water line in the boiler shall be at the lowest of the variable levels, the pin $i'$ may be removed altogether, and the pin $i$ then operates to throw the weight in both directions. When the pin or projection $i'$ is used, it is inserted in that one of the holes which will secure the desired level of water in the boiler. The farther it is located from the pin $i$ the higher will said level be, as will be readily understood.

Having thus fully described my said invention, what I claim as new, and desire to secure by Letters Patent, is—

1. The combination of a steam-boiler, a feeder and regulator therefor, the lower waterline whereof is arranged at substantially the elevation of the upper water-line in said boiler, a water-tank arranged above the water-line in said feeder and regulator, a pipe connecting the upper portion of said feeder and regulator to said boiler above the upper water-line, a pipe connecting the lower portion of said feeder and regulator to said boiler at a point below its lower water-line, a pipe connecting said feeder and regulator from a point below its lower water-line to said tank, check-valves to said two last-mentioned pipes, an exhaust-pipe, valves to said first-mentioned pipe and said last-mentioned pipe, and mechanism within said feeder and regulator whereby said two valves are alternately opened and closed, said mechanism consisting, essentially, of a vertically-movable float within said feeder and regulator carrying a rack-bar, gearing with which said rack-bar engages, and a weight operated by said gearing to alternately fall in one direction and the other and engage with and operate said valves, substantially as set forth.

2. The combination, in an automatic feeder and regulator for steam-boilers, of a steam-pipe, an exhaust-pipe, valves to said pipes arranged on the two sides of a central shaft, a wheel on said central shaft connected to said two valves by links, an arm on said wheel carrying a projection, a weight on said shaft adapted to be thrown from one side to the other over said shaft and come in contact with said projection, and gearing operated by a float to move said weight, substantially as set forth.

3. The combination, with the valves of a feeder and regulator for steam-boilers, of a movable part pivoted centrally between them and connected thereto by links and a central device, a weight mounted upon the same pivot and adapted to engage with said device, gearing for operating said weight, and a float in said feeder for operating said gearing, substantially as set forth.

4. The combination, in a feeder and regulator for steam-boilers, of a float D, having a rack-bar $D^2$, gearing I J K, a weight H, having notches, a wheel G, having an arm with a projection, and valves E and F, connected to said wheel by links $e$ and $f$, said wheel I, weight H, and wheel G being all mounted on a common shaft, substantially as set forth.

5. The combination, in a feeder and regulator for steam-boilers, of two valves connected to operate simultaneously by a series of links and connections, a segment-shaped weight mounted on a pivot or shaft located between said valves and adapted to come in contact with a projection on one of the devices connecting the valves when operated, a float within said feeder and regulator, and mechanism whereby said float operates said weight as said float rises and lowers in operation, substantially as set forth.

In witness whereof I have hereunto set my hand and seal, at Lebanon, Indiana, this 10th day of January, A. D. 1890.

ROBERT H. KERSEY. [L. S.]

Witnesses:
W. O. DARNALL,
E. D. JAMES.